US008877317B2

(12) United States Patent
Zellner, Jr. et al.

(10) Patent No.: US 8,877,317 B2
(45) Date of Patent: Nov. 4, 2014

(54) FOAM FILLED PANEL WITH SEALED DECORATIVE STITCHING AND PROCESS FOR MANUFACTURE THEREOF

(75) Inventors: Kerry Scott Zellner, Jr., Saline, MI (US); Chase Perry Nelson, Cincinnati, OH (US); Timothy A. Pittaluga, Union, KY (US); Michael Brent Hampton, Lexington, KY (US); Garland Wayne Brookshire, Versailles, KY (US); Takashi Niwa, Nagoya (JP)

(73) Assignees: Toyota Motor Engineering & Manufacturing North America, Inc., Erlanger, KY (US); Toyota Motor Corporation, Toyota-shi (JP)

( * ) Notice: Subject to any disclaimer, the term of this patent is extended or adjusted under 35 U.S.C. 154(b) by 242 days.

(21) Appl. No.: 13/435,162

(22) Filed: Mar. 30, 2012

(65) Prior Publication Data

US 2013/0260086 A1  Oct. 3, 2013

(51) Int. Cl.
*B32B 7/08* (2006.01)
*B32B 3/06* (2006.01)

(52) U.S. Cl.
USPC .......................................................... 428/102

(58) Field of Classification Search
CPC .... B60R 13/02; B32B 7/08; B29L 2031/3005
USPC ........ 428/102; 112/402; 156/90, 93; 264/46.5
See application file for complete search history.

(56) References Cited

U.S. PATENT DOCUMENTS

| 2,095,529 A | 10/1937 | Pastor |
| 8,343,607 B2 * | 1/2013 | Pokorzynski et al. .......... 428/43 |
| 2005/0184487 A1 * | 8/2005 | Lanzinger et al. ......... 280/728.3 |
| 2010/0068425 A1 * | 3/2010 | Boinais et al. .................. 428/32 |

FOREIGN PATENT DOCUMENTS

| DE | 2719019 A1 | 11/1978 |
| GB | 436674 | 10/1935 |

* cited by examiner

*Primary Examiner* — Alexander Thomas
(74) *Attorney, Agent, or Firm* — Gifford, Krass, Sprinkle, Anderson & Citkowski, P.C.

(57) ABSTRACT

A foam filled panel with decorative thread stitching is provided. In addition, the stitching can be sealed to prevent leakage of foam when it is injected between a substrate and a skin layer to provide a foam filled panel. The decorative thread stitching can be sewn into the skin layer of the foam filled panel before the panel is assembled and filled with injectable foam. In addition, the skin can be made via slush molding, which allows various features and details to be molded into the skin. In some instances, the stitching can be sealed by adhesively attaching an impermeable membrane along a length of the stitching, thereby covering all the openings. In other instances, the stitching is sealed by using an expandable thread. Also disclosed is a process for manufacturing a foam filled panel with decorative thread stitching.

8 Claims, 6 Drawing Sheets

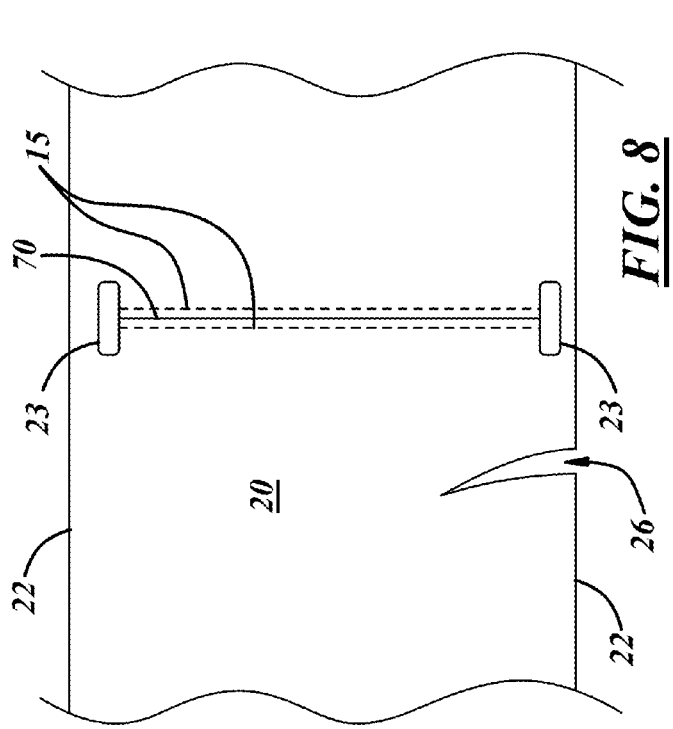
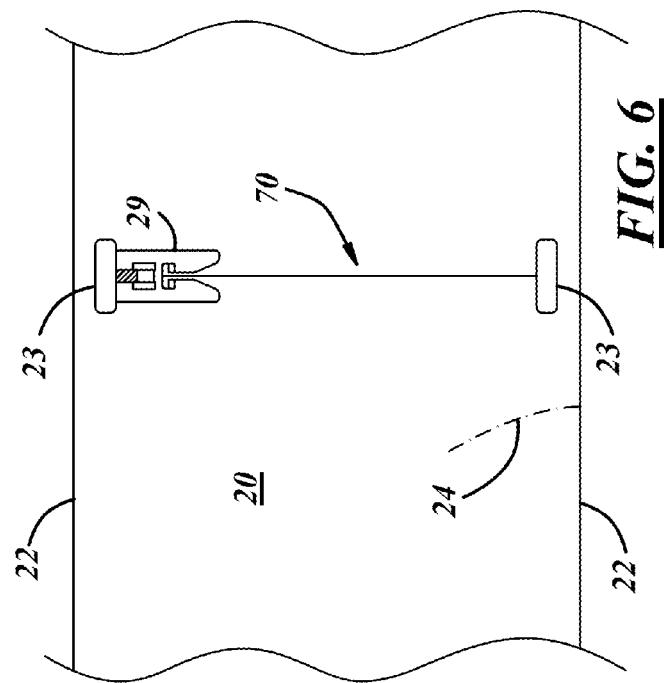
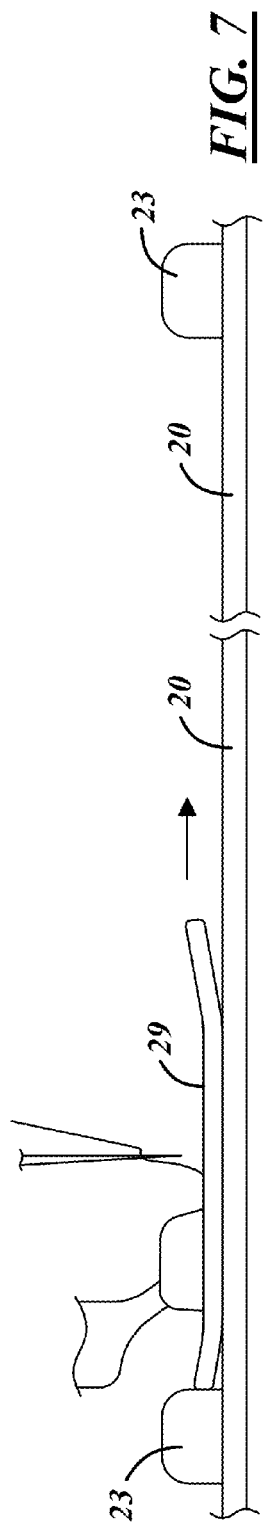

FOAM FILLED PANEL WITH SEALED DECORATIVE STITCHING AND PROCESS FOR MANUFACTURE THEREOF

FIELD OF THE INVENTION

The present invention is related to a foam filled panel, and in particular, to a foam filled panel with sealed decorative stitching.

BACKGROUND OF THE INVENTION

Panels that have a layer of foam between an outer skin and an inner substrate are known. Such panels typically have the layer of foam extending across at least part of the substrate layer with the skin extending across the foam layer such that a three layered panel is provided. For example, instrument panels for motor vehicles can include such a panel with the substrate typically made from a polymeric material and the skin made from a flexible sheet material such as leather, flexible polymeric materials and the like. In between the substrate and the skin, the foam layer provides a cushioned appearance and/or feel, which can provide the look and feel of a luxury vehicle and the like. To increase the luxurious look, decorative stitching may be added to the skin of the panel, making it appear to have a higher level of craftsmanship and detail.

Production methods known to those skilled in the art of a panel typically include placing the substrate and the skin in a clamshell foam-filling apparatus such that upon closure of the clamshell apparatus the edges of the skin are joined against appropriate regions of the substrate to create a bounded region between the skin layer and the substrate layer. The bounded region between the skin and substrate is then filled with injectable foam padding. However, a problem arises when the skin is pre-sewn with decorative thread stitching, being that the injectable foam can leak out of the bounded area through a space between the decorative thread and a hole created in the skin by a sewing needle when the decorative thread was stitched in place.

SUMMARY OF THE INVENTION

A foam filled panel with decorative thread stitching is provided. In addition, the stitching can be sealed to prevent leakage of foam when it is injected between a substrate and a skin layer to provide a foam filled panel.

The decorative thread stitching can be sewn into the skin layer of the foam filled panel before the panel is assembled and filled with injectable foam. In addition, the skin can be made via slush molding, which allows various features and details to be molded into the skin. One of these features can be a recessed valley or crevice designed to look like a seam. In some instances, the stitching can be a "French seam" and run parallel along both sides of the recessed valley and thereby provide an appearance of separate pieces of skin sewn together when in fact there is only a single skin piece. In other instances, the stitch can be a "deck seam" that has only one stitch line that is provided along a skin flap that is folded over onto itself. In any event, the stitching can be sewn by sewing machine and have a top thread and a bottom thread.

Once the decorative thread stitching has been sewn, openings between a needle hole in the skin and thread within the needle hole can be sealed to prevent the liquid foam from leaking out through the openings. In some instances, the stitching can be sealed by adhesively attaching an impermeable membrane along a length of the stitching, thereby covering all the openings. The membrane can be attached on a side of the skin that will be facing a substrate backing and is not visible from an exterior of the panel when manufacture thereof is completed. In other instances, the stitching is sealed using an expandable thread. For example, a thread that expands when wet can be used for stitching the skin layer, the thread expanding to fill the open space between the needle hole and the thread. Where the stitching has a top and a bottom thread, only one thread can be an expanding type thread, while the other thread can be a nonexpanding type thread. As such, using the stitching with a top and a bottom thread allows designers to select one thread based on expansion characteristics and the other thread based on aesthetic characteristics.

The skin with decorative thread stitching that has been sealed as discussed above can be attached or joined with a substrate layer to create a bounded and/or void area therebetween. This bounded area can be filled with an injectable foam padding material and thereby create a foam filled panel with decorative thread stitching.

Also disclosed is a process for manufacturing a foam filled panel with decorative thread stitching. The process can include providing a substrate layer, a skin layer, a decorative thread and an injectable foam. The skin, which can be made from a slush molded material, can include a molded seam and/or a deck seam sewn with the decorative thread. The sewing can be done by machine utilizing a top and bottom thread, or in the alternative, only one thread. Sewing of the skin layer can create holes in the skin where the needle and thread pass therethrough and an open space can be present between the thread and the hole. In addition, the process can seal open space between the thread and the hole to prevent the injectable foam from leaking out during the foam filling process.

Sealing the open space between the thread and the holes in the skin can be done by adhesively attaching an impermeable membrane along the decorative thread stitching. The membrane can be attached along the surface of the skin that will be closest to the substrate layer before the skin is attached or joined to the substrate and a bounded region between the substrate layer and the skin layer is filled with liquid foam material.

Sealing the open space around the thread in the holes in the skin can also be accomplished by using a thread that expands in response to moisture as discussed above, with the thread wetted to expand and seal the holes before the bounded region is filled with foam.

In addition to the above, the skin can have one or more raised protrusions, also referred to as a bump(s), that can be used as a start location and/or a stop location for a sewing machine and/or a sewing machine pressure foot such that accurate and consistent start and/or stop stitching locations are provided on the skin. Furthermore, the skin can be slush molded with a three-dimensional corner region and one or more perforations extending inwardly from an edge of the skin a predefined amount such that before the decorative thread stitching has been applied to the skin, the skin can be torn along the perforations to provide a slot or slit. In addition, the slot or slit can afford the edge and/or three-dimensional corner regions of the skin proximate to the crevice or skin flap to be more easily flattened and sewn without the need of specialized sewing machine equipment.

BRIEF DESCRIPTION OF THE DRAWINGS

FIG. 1A is an expanded view of the circled region 1A in FIG. 1;

FIG. 6 is a top view of slush molded skin having a pair of bumps for providing an accurate start and stop location for decorative thread stitching and a perforation for providing a tear location proximate to an edge of the skin;

FIG. 7 is a side view of the skin shown in FIG. 6;

FIG. 8 is a top view of the skin shown in FIG. 6 after the decorative thread stitching has been applied and the perforation has been used to provide a tear proximate the edge or corner of the skin.

DETAILED DESCRIPTION OF THE PRESENT INVENTION

The present invention provides a foam filled panel with decorative thread stitching. As such, the present invention has utility as a component for a motor vehicle.

The foam filled panel with decorative thread stitching can be in the form of an instrument panel for a motor vehicle, however this is not required. In addition, the foam filled panel can be made from a three layer design having a substrate layer and a skin layer, herein also referred to simply as a substrate and a skin, respectively. The skin and the substrate can be attached or joined by methods known to those skilled in the art to create a bounded or void area which is filled with injectable foam to form an injectable foam padding layer.

The decorative thread can be stitched into the skin before the skin and substrate are attached or joined to each other, and the decorative thread stitch can be sealed so that the injectable foam does not leak through holes created during the stitching or sewing process. It is appreciated that the substrate layer, the skin layer, and the injectable foam padding layer can be made from any material known to those skilled in the art, illustratively including plastics, leather, elastomeric material, polymer sheet materials, metals, alloys, ceramics, wood, cloth materials, fiber materials and the like.

The skin layer can include a molded depression or crevice that creates a visual seam and the decorative thread stitching can be sewn along each side of the molded depression to give an appearance of separate sheets of skin being sewn together. In the alternative, the skin can have a fold or flap folded over itself and single decorative thread stitching can be sewn over the fold live to give an appearance of a seam.

Figure 1:
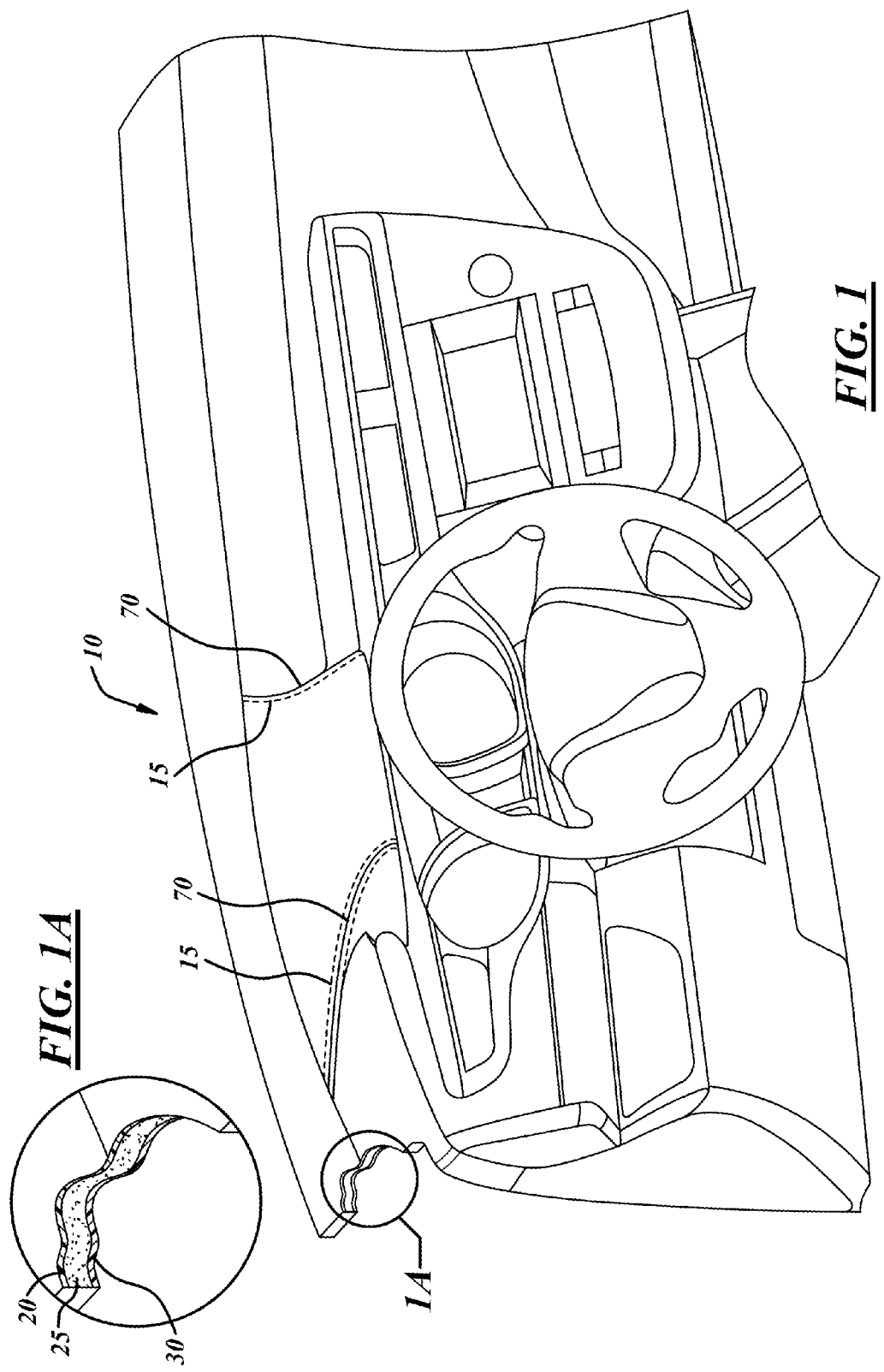
FIG. 1 is a perspective view of a foam filled panel having decorative thread stitching according to an embodiment of the present invention.

Turning now to FIG. 1, an embodiment of a foam filled panel with decorative thread stitching in the form of an instrument panel for a motor vehicle is shown generally at reference number 10. The panel 10 can have a substrate layer 30, a skin layer 20, and an injectable foam padding layer 25 in the bounded region between the skin layer 20 and the substrate layer 30 as shown in FIG. 1A. The skin layer 20 can have molded depressions or crevices 70, along which decorative thread stitching 15 can be sewn to give an outer surface of the panel 10 a more luxurious appearance.

Figure 2:
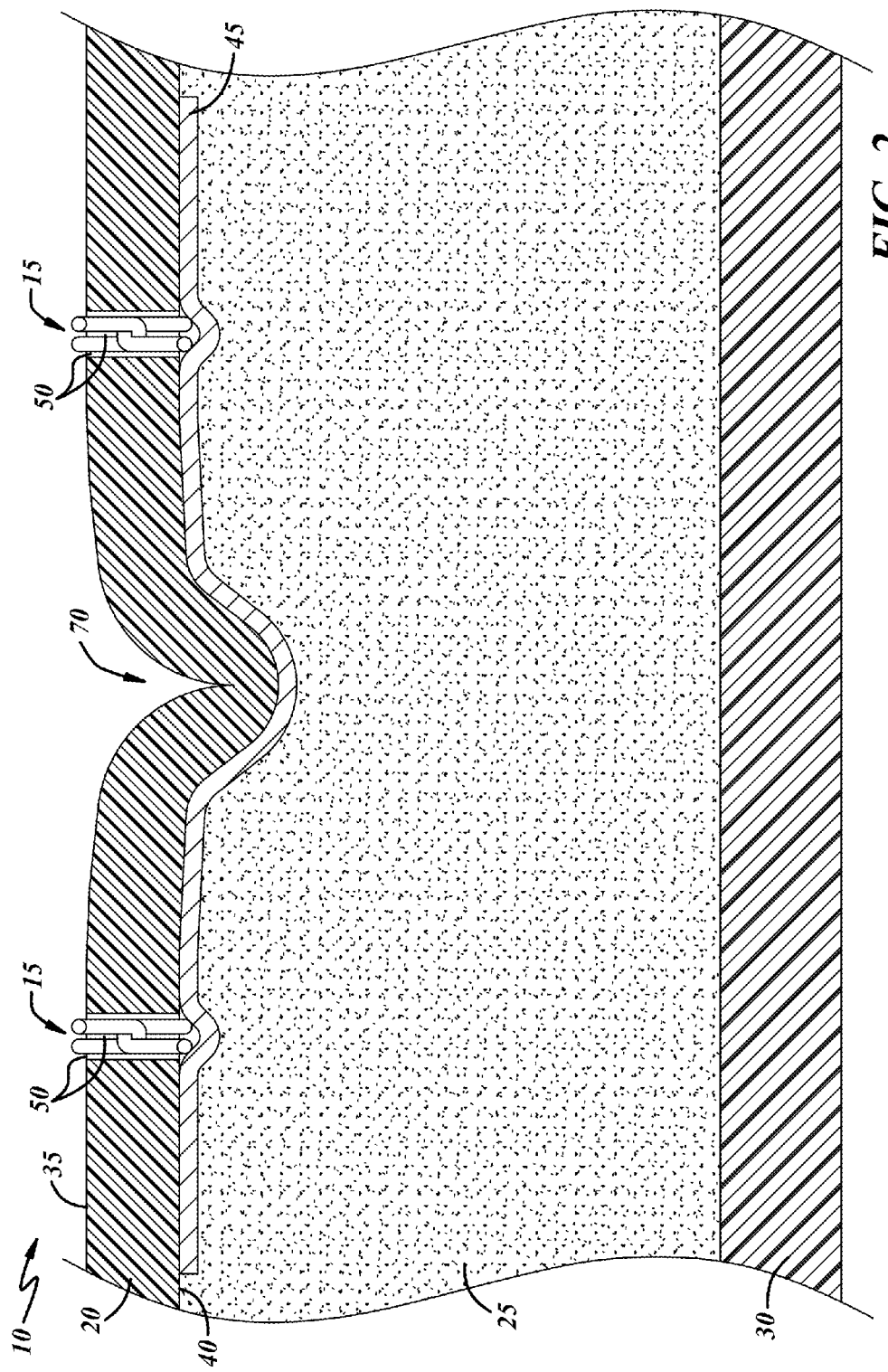
FIG. 2 is a front cross-sectional view of a portion of the foam filled panel having decorative thread stitching with an impermeable membrane placed or attached across the stitching.

FIG. 2 illustrates a front cross sectional view of a portion of the panel 10 utilizing an impermeable membrane 45 secured to an inside surface 40 of the skin layer 20. The impermeable membrane 45 can extend over or across the decorative thread stitching 15 and seal the decorative thread stitching 15. It is appreciated that the sealing of the decorative thread stitching 15 can prevent injectable foam 25 from leaking out of an open space 50 between a hole created when the skin layer 20 is sewn with the decorative thread stitching 15. In a preferred embodiment the impermeable membrane 45 is adhesively attached to the skin layer 20.

Figure 3:
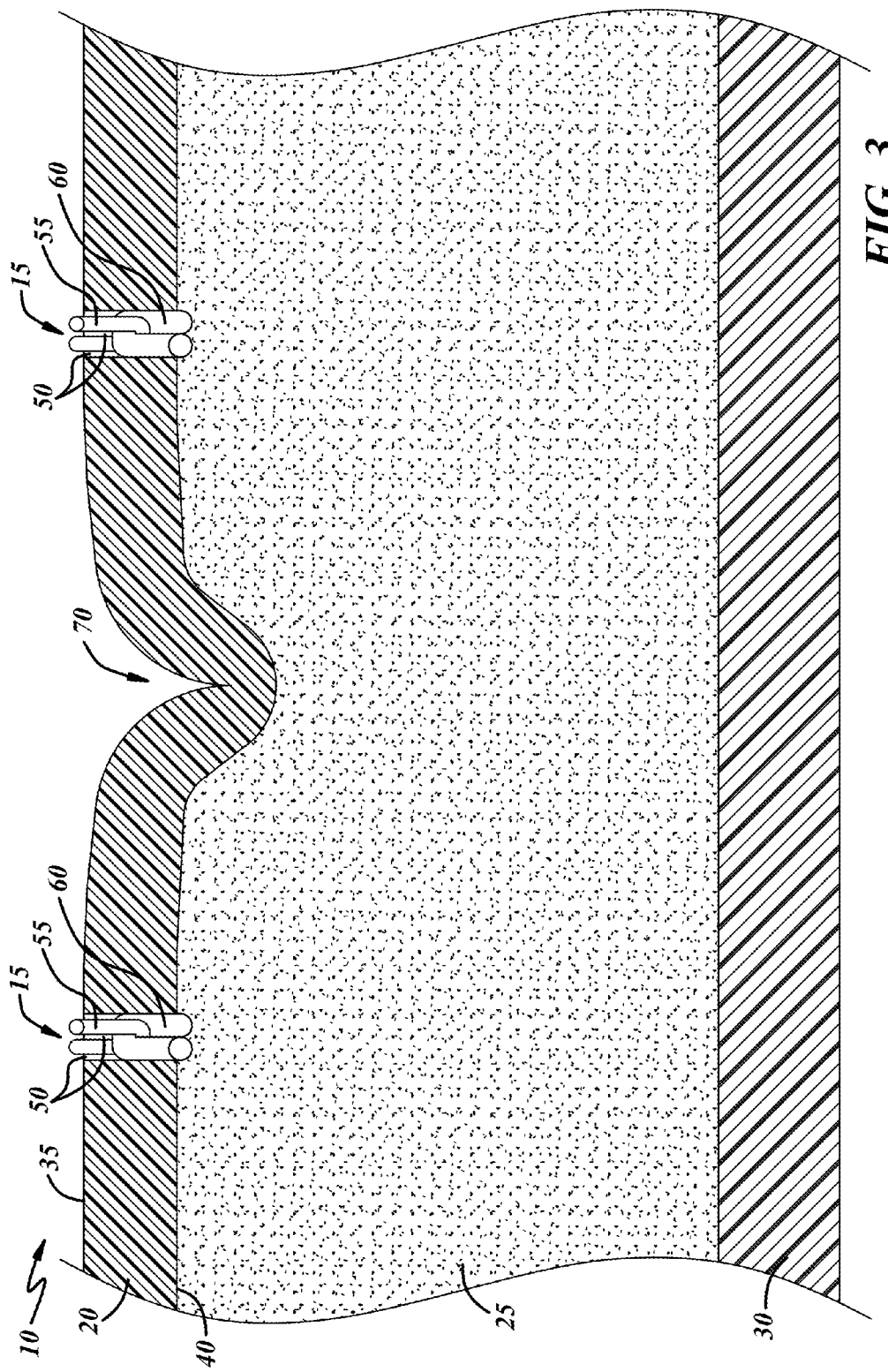
FIG. 3 is a front cross-sectional view of a portion of the foam filled panel having decorative thread stitching which expands in response to moisture to seal the stitching.
Figure 4:
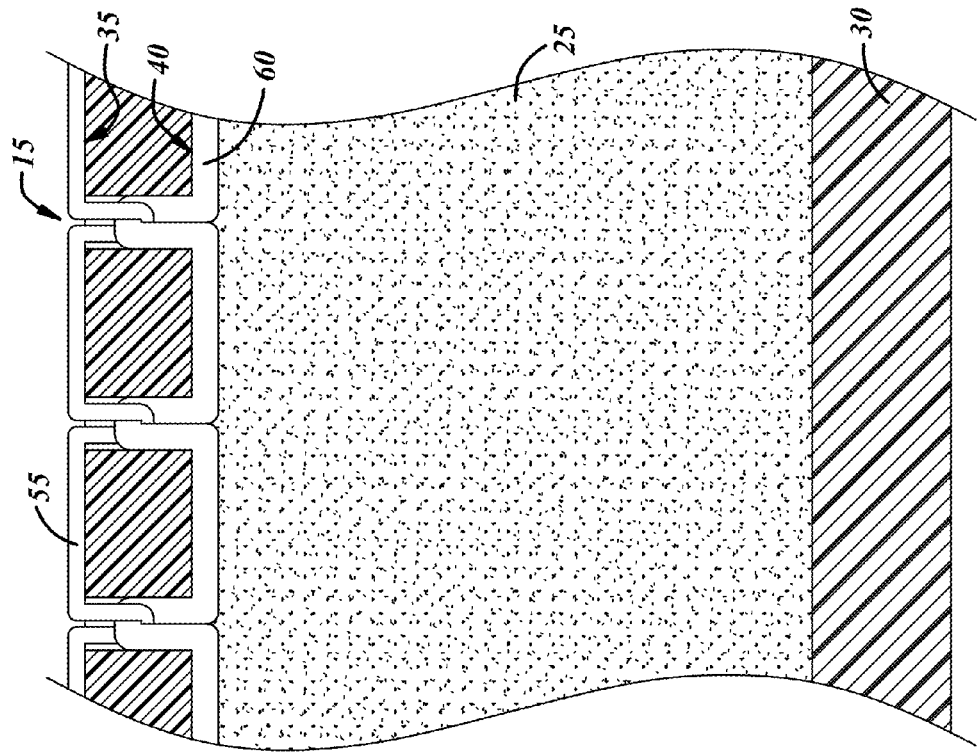
FIG. 4 is a side cross-sectional view of a portion of the foam filled panel having decorative thread stitching which does not expand.
Figure 5:
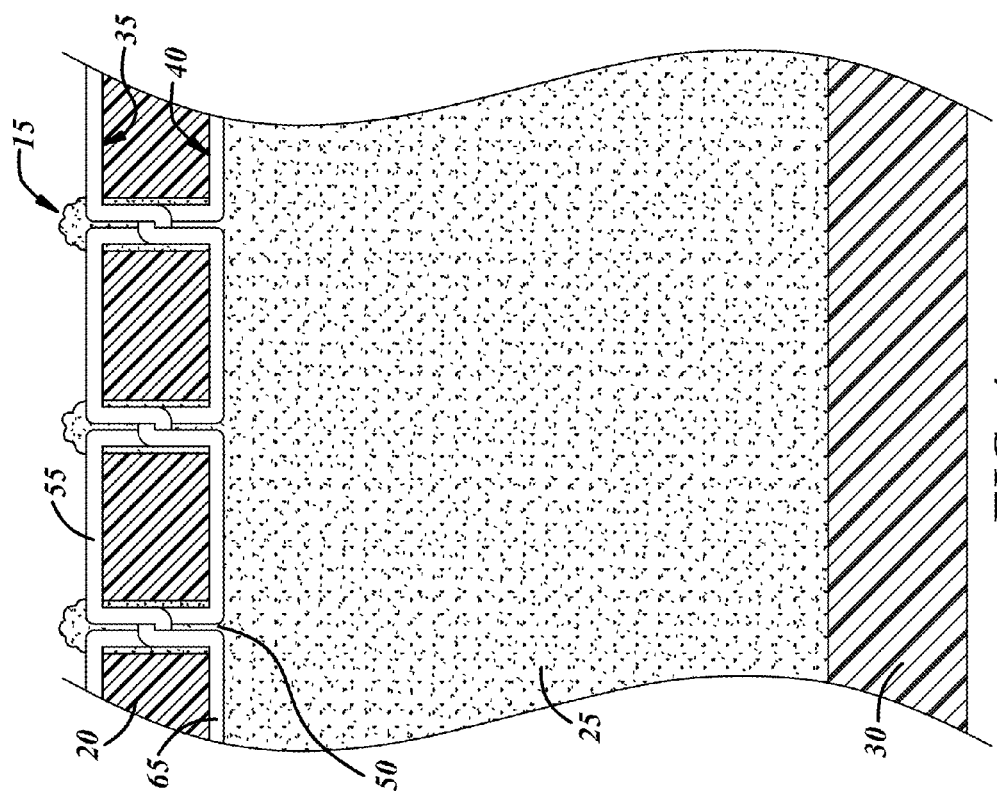
FIG. 5 is a side cross-sectional view of a portion of the foam filled panel having decorative thread stitching which expands in response to moisture to seal in the foam.
Figure 9:
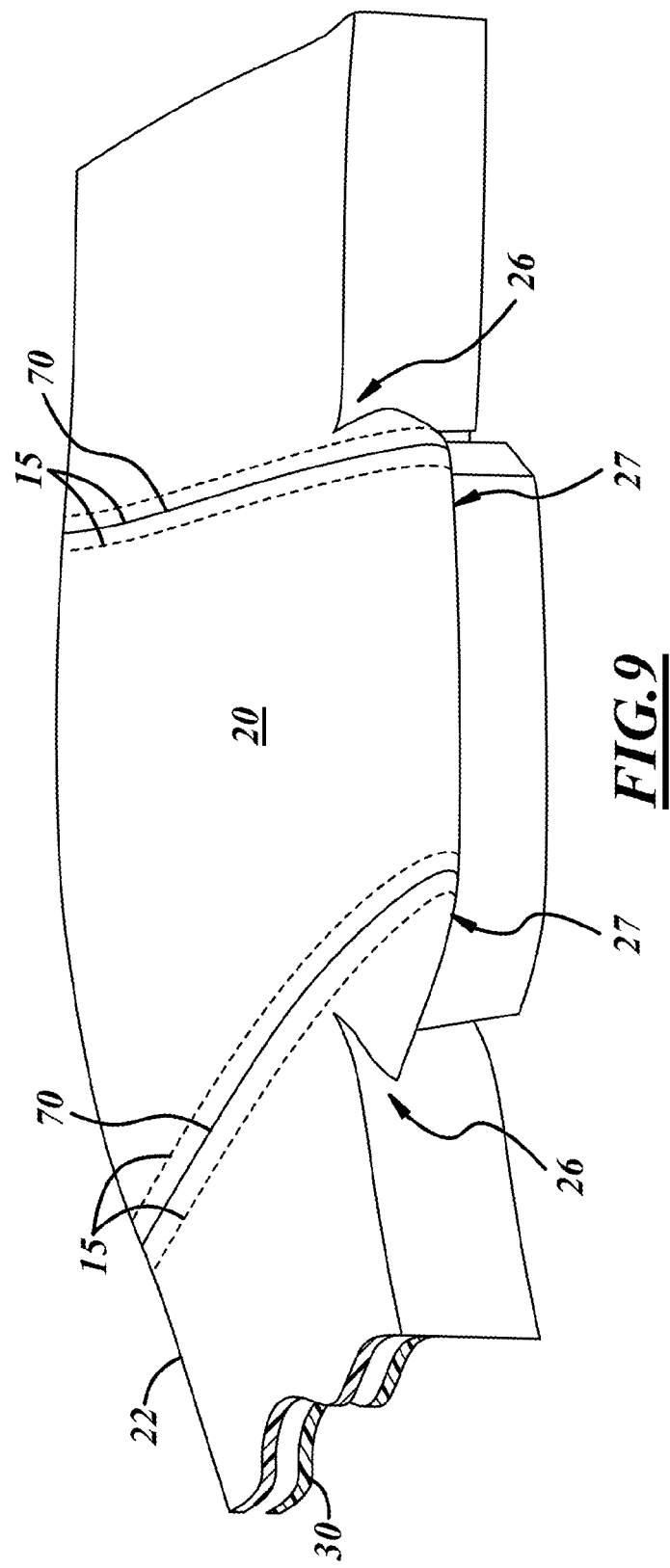
FIG. 9 is a top perspective view of the skin shown in FIG. 8 illustrating a pair of slots or slits that aid in flattening three-dimensional corner regions of the skin before and during sewing thereof and thereby aiding in the sewing operation.

Turning now to FIGS. 3-5, front and side cross sectional views of a portion of a foam filled panel with decorative stitching are shown. The decorative thread stitching 15 can be machine stitched to have top thread 55 which is visible on the outside surface 35 of the skin layer 20, and an expanding bottom thread 60 or a nonexpanding bottom thread 65. The expanding bottom thread 60 and the nonexpanding bottom thread 65 run along the inside surface 40 of the skin 20. If a nonexpanding bottom thread 65 is used, the injectable foam padding 25 can leak through the open space 50 as illustrated in FIG. 4.

An alternative to using an impermeable membrane 45 to seal the open space 50 is to use the expanding bottom thread 60. The expanding bottom thread 60 increases in diameter in response to moisture, i.e. after coming into contact with moisture. As such, after the decorative thread stitching 15 is stitched into the skin, the expanding bottom thread 60 can be wetted, whereby it increases in diameter to fill the open space 50 and seal the decorative thread stitching 15 from any leaking injectable foam 25 as illustrated in FIGS. 3 and 5. In a preferred embodiment, the top thread 55 can be selected for it aesthetic characteristics, and the expanding bottom thread 60 can be selected for its expansion characteristics in response to moisture.

Referring now to FIGS. 6-7, the skin 20 is shown having a protrusion or bump 23 extending therefrom. The bump 23 can be part of the skin 20 and may or may not be made during the slush molding of the skin 20. In addition, the bump 23 can provide a start and/or stop location for a sewing machine pressure foot 29 to start and/or stop against and thus afford an accurate start and/or start location for the decorative thread stitching 15 as shown in FIG. 8.

FIGS. 6 and 8 also illustrate a perforation 24 within the skin 20, the perforation 24 extending inwardly from an edge 22 of the skin 20 a predefined distance. The perforation 24 can be in the form of a plurality of indentations into the skin 20 and can be used as a tear location or seam that affords for an individual to grasp the skin 20 on both sides of the perforation and provide a tear or slot 26 as shown in FIG. 8. It is appreciated that such a tear or slot 26 can be proximate to a three-dimensional corner region 27 of the skin 20. In addition, the tear or slot 26 affords for the three-dimensional corner region 27 to be flattened before and during sewing of the decorative thread stitching 15 without the need for specialized sewing equipment. In this manner a sewing machine that is typically used to sew the decorative thread stitching 15 on generally flat portions of the skin 20 can also be used to sew contoured portions of the skin 20.

The above embodiment and teachings are for illustrative purposes only and are not meant to limit the scope of the invention. As such, modifications, changes, and the like will occur to those skilled in the art given the teaching herein and thus can fall within the scope of the invention. As such, it is the claims and all equivalents thereof that define the invention and its scope.

We claim:

1. A foam filled panel with a decorative thread stitching comprising:
a substrate layer, a skin layer, a decorative thread stitching extending through and across said skin layer, an injectable foam layer and a sealing component, said sealing component being a decorative thread that expands when placed in contact with moisture and expansion of said decorative thread fills an open space between said decorative thread and a hole in said skin layer;
said sealing component extending across said decorative thread stitching and preventing liquid foam used to produce said injectable foam layer from leaking through said decorative thread stitching and said skin layer.

2. The foam filled panel of claim 1, wherein said skin is a slush molded skin layer.

3. The foam filled panel of claim 1, wherein said decorative thread has a top thread and a bottom thread, said bottom thread disposed along an inside surface of said skin layer and said top thread disposed along an outside surface of said skin layer.

4. The foam filled panel of claim 3, wherein said skin is a slush molded skin layer.

5. The foam filled panel of claim 3, wherein said sealing component is said bottom thread, said bottom thread expanding when wet and filling an open space between said bottom thread and a hole in said skin layer.

6. The foam filled panel of claim 5, wherein said skin is a slush molded type of material.

7. The foam filled panel of claim 1, wherein said skin has a protrusion extending therefrom, said protrusion operable to provide at least one of a stop and start for a sewing machine pressure foot during sewing of said decorative thread stitching.

8. The foam filled panel of claim 1, wherein said skin has a perforation extending inwardly from an edge of said skin, said perforation operable for an individual to grasp said skin and provide a tear along said perforation.

* * * * *